United States Patent
Adeyemi et al.

(10) Patent No.: US 6,270,440 B1
(45) Date of Patent: Aug. 7, 2001

(54) DIFFERENTIAL SIDE GEAR WITH INTEGRAL SHAFT

(75) Inventors: Nurudeen B Adeyemi, Sterling Heights; Steven A Mikel, Farmington Hills; Jeffrey S Ward, Rochester Hills; Robert F Bis, Waterford, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/498,888

(22) Filed: Feb. 7, 2000

(51) Int. Cl.[7] .................................................. F16H 48/08
(52) U.S. Cl. ............................... 475/230; 475/198
(58) Field of Search .............................. 475/84, 159, 198, 475/230

(56) References Cited

U.S. PATENT DOCUMENTS 783,168 * 2/1905 Baker ................................... 475/244
2,061,009 * 11/1936 Rothrock ............................. 475/230
3,309,943 * 3/1967 Kosman et al. .................... 475/159

FOREIGN PATENT DOCUMENTS 59-205061 * 11/1984 (JP) ..................................... 475/240

* cited by examiner

Primary Examiner—Sherry Estremsky
(74) Attorney, Agent, or Firm—Marc Lorelli

(57) ABSTRACT

A differential assembly is disclosed that is operable to prevent the escape of fluid from the assembly. The differential assembly further allows the transmission to be transported while containing fluid. The differential assembly further allows increased driveshaft lengths for reduced torque steer tendencies and improved constant velocity joint angles. The differential assembly includes a pair of differential side gears each integrally formed to a hollow stub shaft. Plug members disposed within the hollow stub shafts define an enclosed space in the differential housing, thereby preventing fluid escape from the differential assembly and the transmission.

9 Claims, 2 Drawing Sheets

DIFFERENTIAL SIDE GEAR WITH INTEGRAL SHAFT

FIELD OF THE INVENTION

The present invention relates to a differential assembly for motor vehicles of the type used in motor vehicle drivetrain applications.

BACKGROUND OF THE INVENTION

Various types of differential assemblies are used in motor vehicles to redirect the transfer of power to the driving axles. In a rear-wheel drive vehicle, the transmission shaft from the gearbox turns the differential through a crown wheel and pinion. In a front-wheel drive car, the gearbox may drive the differential directly through a pair of helical spur gears. Four-wheel drive vehicles have two or three differentials, one for each driving pair of wheels and sometimes one between the front differential and the rear differential. All differentials allow the axle stub shafts or drive shafts, and subsequently, the wheels of the vehicle to be rotated at varying speeds as needed. In general, the side gears (which are connected to the axle stub shafts) and the pinion gears mesh to redirect the transfer of power to the driving axles/shafts.

In a typical differential gear arrangement, the drive pinion gear turns the differential input gear and the differential case attached to it. The differential pinion gears that are mounted in the case mesh with the differential side gears that are splined to the differential output shafts. In front-wheel drive vehicles, the drivetrain is often compacted into an engine/transaxle/driving axles "package" that provides torque to the front wheels. The transaxle assembly, comprising the transmission and the differential assembly, is often shipped modularly from vehicle powertrain plants to vehicle assembly plants to be installed in the vehicle. At the assembly plant, the axles are installed to the differential assembly by meshing them with the side gears. Once the axles have been installed, the transmission and differential assembly become enclosed and appropriate lubricating fluids are added to various components.

A disadvantage of conventional differential assemblies in front wheel drive transaxles is that they cannot be filled with lubricant until the drive shafts are installed at the assembly plant. Because the side gear and axle shafts are not assembled until they reach the assembly plant, the transaxle is not enclosed and is vulnerable to the ambient environment; therefore, special shipping and handling procedures are required to assure undamaged components. Moreover, valuable time and manpower are used at the final assembly plant for filling specific components with appropriate fluids following the installation of the axles into the differential assembly.

Additionally, the transaxle cannot be washed after filling since it is already assembled in the vehicle. Any spillage may be perceived as leakage by the customer. This causes unnecessary dissatisfaction and warranty cost. Also, filling in the vehicle is less accurate due to temperature variance and level inaccuracies.

SUMMARY OF THE INVENTION

Accordingly, it is an object of the present invention to provide improved shipping and handling of a filled, sealed, and washed transaxle by keeping driveshaft driving and retaining features dry and internal to the modular assembly.

A further object of the invention is to reduce the time and manpower required at the assembly plant absorbed while adding appropriate fluids to drivetrain components.

An additional object of the invention is to increase the driveshaft lengths for reduced torque steer tendencies and improved constant velocity joint angles.

The present invention integrates the side gear with a hollow splined axle stub shaft which allows for easier assembly of the axle shaft at the assembly plant. In addition, the utilization of sealing devices (such as cup-shaped plug members) disposed within the hollow axle stub shafts to define an enclosed space to prevent fluid escape, thereby allowing a pre-filled and washed transmission to be shipped to the assembly plant.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 2:
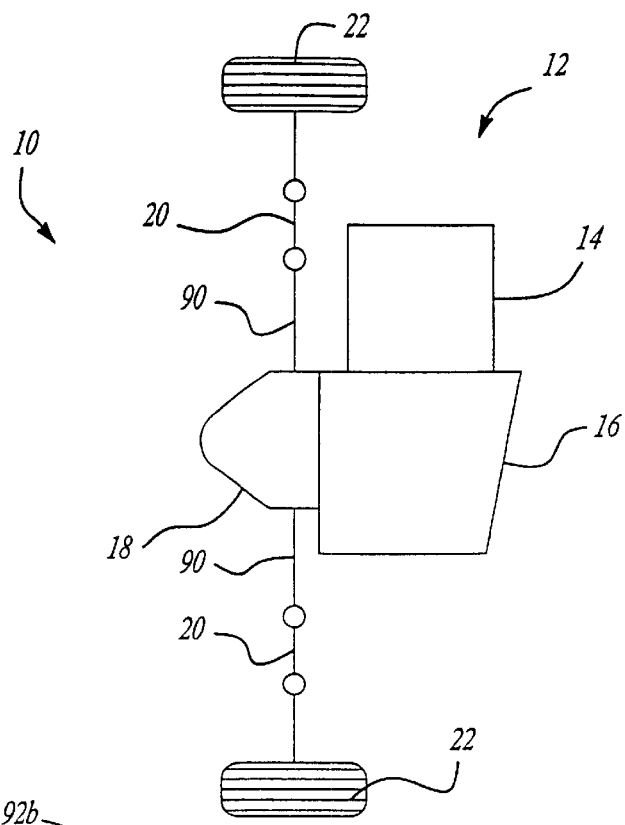
FIG. 2 illustrates the drivetrain of a front-wheel drive vehicle equipped with the drivetrain of the present invention.

With particular reference to FIG. 2 of the drawings, a drivetrain 10 for a front-wheel drive vehicle is shown. Drivetrain 10 includes a front driveline 12 drivable from a power source 14, such as an engine, through a transmission 16 which may be of the manual or automatic type. Front driveline 12 includes a pair of front wheels 22 connected at opposing ends of a front axle assembly 20 having a differential 18.

Figure 1:
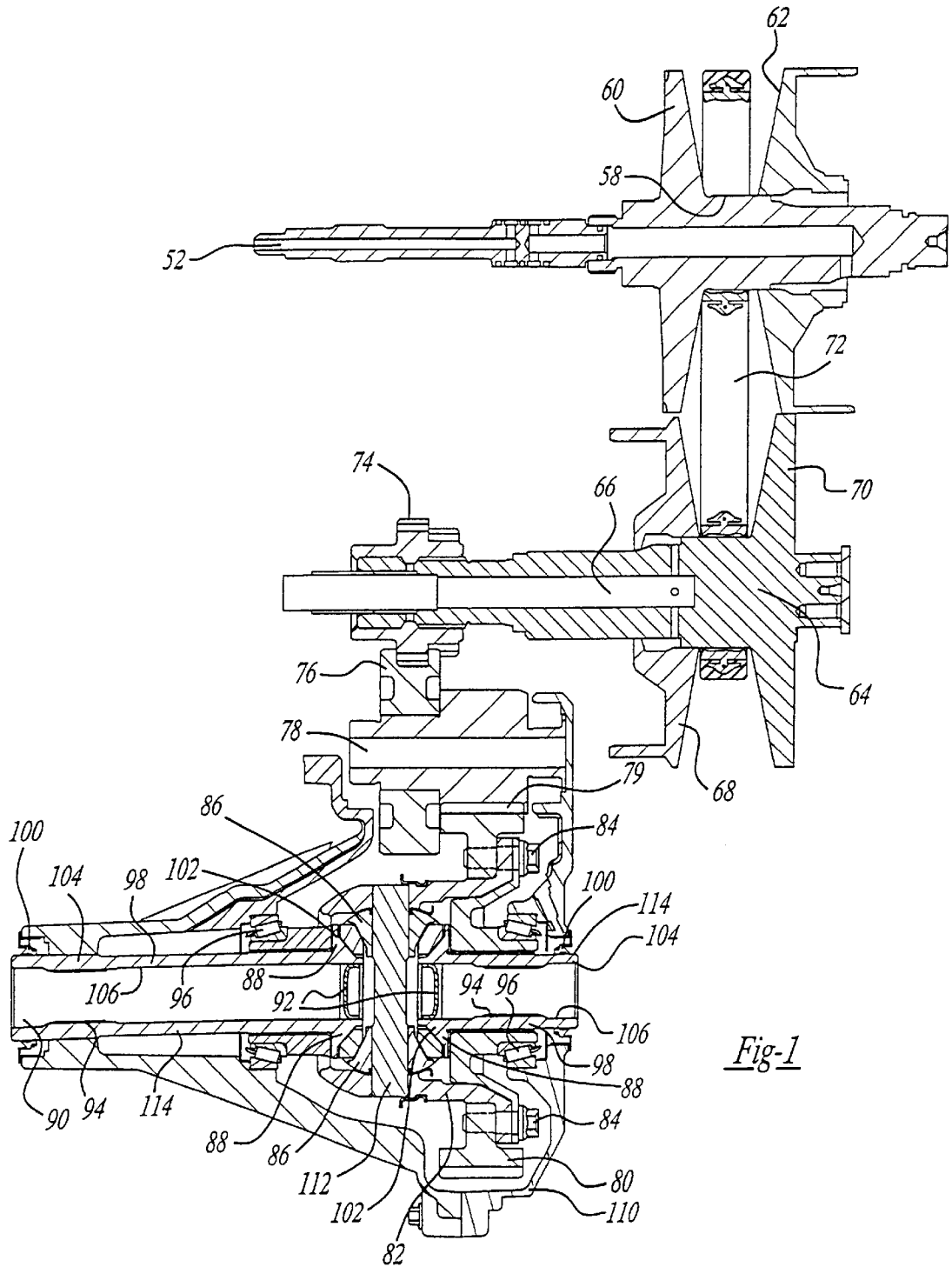
FIG. 1 represents a transaxle equipped with the differential assembly of the present invention.

With particular reference to FIG. 1 of the drawings, the transmission 16 is shown to include a primary shaft 52 driven at one end by the power source 14 and transmitting power to a secondary shaft 66 via a driving belt 72.

At the opposite end of the secondary shaft 66, secondary shaft gear 74 meshes with transfer shaft gear 76 to transmit power from the secondary shaft 66 to the transfer shaft 78. Transfer shaft 78 transmits power to the differential input gear 80 of differential assembly 18 via gear 79. Differential input gear 80 is mounted to a differential case 82 by fasteners 84, such as bolts.

Differential bearings 96 are received in the housing 110 to receive and support the differential case 82 for rotation. Rotation of the transfer shaft 78 thus also causes rotation of the differential case 82.

The assembled differential case 82 receives and supports a pinion gear shaft 112. The ends of the pinion gear shaft 112 are received in the differential case 82 and the pinion gear shaft 112 rotates with the differential case 82 about an axis.

Each end of the pinion gear shaft 112 receives a pinion gear 86. The pinion gears 86 are rotatable relative to the pinion gear shaft 112.

Hollow stub shafts 98 are received and supported by the housing 110. Stub shafts 98 each include an inner surface 106, an outer surface 114, a first end 102, and a second end 104. Integrally formed at the first end 102 of each hollow stub shaft 98 is a side gear 88. Each pinion gear 86 meshingly engages the side gears 88. The inner surface 106 of the second end 104 of each hollow stub shaft 98 contains an internal spline 94. An axle shaft 90 (shown best in FIG. 2) is provided with an external spline which engages the internal spline 94 of stub shafts 98. Upon rotation of the differential case 82 about its axis, each side gear 88 with its integrally formed hollow stub shaft 98 rotates an axle shaft 90 about its axis to drive the vehicle to which the differential assembly 18 is mounted.

A cup-shaped plug 92 is located on the inner surface 106 at the first end 102 of each hollow stub shaft 98. Each plug 92 is secured in place by a suitable method, such as press fitting. The plugs 92 define an enclosed space for preventing fluid escape from the differential assembly 18. Seals 100 are disposed between the differential housing 110 and the outer surface 114 of the second end 104 of each hollow stub shaft 98.

Figure 3:
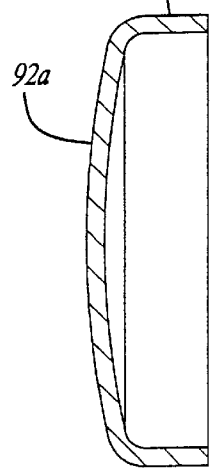
FIG. 3 is a cross-sectional view of the cup plug member according to the principles of the present invention.
Figure 4:
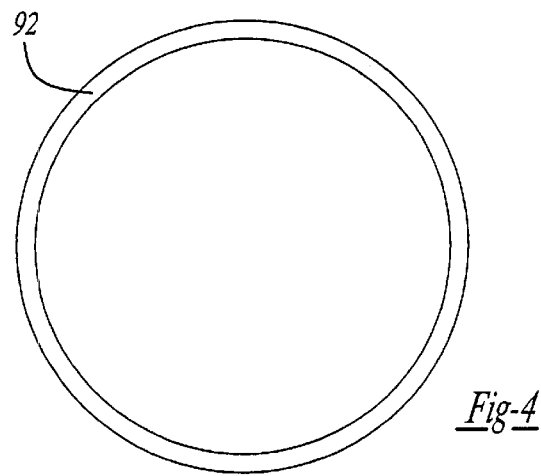
FIG. 4 is a plan view of the cup plug member according to the principles of the present invention.

With reference to FIG. 3 and FIG. 4, the cup-shaped plug 92 includes a generally spherical base portion 92a and an annular wall portion 92b. The sharp edges of the annular wall portion 92b of the cup-shaped plug 92 create a smooth surface to provide a seal once it is installed into the hollow stub shaft 98. The spherical base portion 92a prevents deformation of the cup-shaped plug 92 during its installation, which is done by press fitting.

The differential assembly build procedure includes a differential sub-system build followed by its assembly into the transmission. This includes pressing a cup plug 92 into each of the side gears 88. One of the side gears 86 is then assembled into the differential case 82. A pinion gear 86 is then placed in the differential case 82, and the pinion shaft 112 is slid through the pinion gear 86. The other pinion gear 86 is assembled into the differential case 82, and the pinion shaft 112 is centered between the pinion gears 86. The other side gear 88 is meshed with the pinion gears 86. A press fit is made for supports for the differential case 82. Differential input gear 80 is mounted onto the differential case 82 and bolted together by the fasteners 84.

After the complete differential assembly is assembled into the transmission case body, the transmission case bell housing is assembled and output seals are installed on both sides of the transmission. Once the transmission is fully tested and the oil pan is assembled, it is filled with transmission fluid according to a pre-determined weight or fluid level, washed, and shipped.

It should now be appreciated that the present invention offers some significant advantages over previous methods of assembly. The present invention provides improved shipping and handling of the transaxle by keeping sealing and driving features internal to the modular assembly. These internal drive features also provide for increased driveshaft lengths for improved constant velocity joint angles and reduced torque steer tendencies. The utilization of a pair of cup-shaped plug members disposed within the hollow axle stub shafts defines an enclosed space for preventing fluid escape, thereby allowing a pre-filled transmission to be shipped to the assembly plant.

In addition, the present invention reduces the time and manpower required at the assembly plant absorbed while adding appropriate fluids to drivetrain components. The invention integrates the side gear with a hollow splined axle stub shaft which allows for easy assembly of the axle shaft at the assembly plant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A differential assembly comprising:
   a rotatable housing;
   a pinion shaft supported by said housing;
   a pair of pinion gears rotatably supported by said pinion shaft;
   a pair of side gears meshingly engaged with said pair of pinion gears and each integrally formed with a hollow shaft; and
   a pair of plug members disposed within said hollow shafts for preventing fluid escape from said differential.

2. The differential assembly according to claim 1, wherein said hollow shafts each include an internal spline adapted to be mated with an external spline of an axle shaft.

3. The differential assembly according to claim 1, wherein said plug members are cup shaped including a base portion and an annular wall portion extending from said base portion.

4. The differential assembly according to claim 3, wherein said annular wall portion has a terminal end with a sharp edge portion.

5. A vehicle powertrain comprising:
   a power source;
   a transmission mechanism connected to said power source; and
   a differential assembly drivingly connected to said transmission mechanism and including:
      a housing;
      a pinion shaft supported by said housing;
      a pair of pinion gears rotatably supported by said pinion shaft;
      a pair of side gears meshingly engaged with said pair of pinion gears and each integrally formed with a hollow shaft; and
      a pair of plug members disposed within said hollow shafts for defining an enclosed space for preventing fluid escape from said differential.

6. The vehicle powertrain according to claim 5, wherein said transmission mechanism and said differential assembly are mounted within a common housing.

7. The vehicle powertrain according to claim 6, wherein said hollow shafts are housed substantially within said common housing.

8. The vehicle powertrain according to claim 5, wherein said plug members are cup shaped including a base portion and an annular wall portion extending from said base portion.

9. The vehicle powertrain according to claim 8, wherein said annular wall portion has a terminal end with a sharp edge portion.

\* \* \* \* \*